US007698235B2

(12) United States Patent
Kuroiwa (10) Patent No.: US 7,698,235 B2
(45) Date of Patent: Apr. 13, 2010

(54) ENSEMBLE LEARNING SYSTEM AND METHOD

(75) Inventor: Yukiko Kuroiwa, Tokyo (JP)

(73) Assignee: NEC Corporation, Tokyo (JP)

( * ) Notice: Subject to any disclaimer, the term of this patent is extended or adjusted under 35 U.S.C. 154(b) by 540 days.

(21) Appl. No.: 10/952,334

(22) Filed: Sep. 28, 2004

(65) Prior Publication Data

US 2005/0071301 A1 Mar. 31, 2005

(30) Foreign Application Priority Data

Sep. 29, 2003 (JP) ............................. 2003-338793

(51) Int. Cl.
*G06F 15/18* (2006.01)
(52) U.S. Cl. .......................... 706/12; 706/45
(58) Field of Classification Search ................... 706/12, 706/45
See application file for complete search history.

(56) References Cited

U.S. PATENT DOCUMENTS

| 2002/0184169 | A1* | 12/2002 | Opitz | .......................... 706/20 |
| 2003/0033436 | A1* | 2/2003 | Weiss | .......................... 709/310 |

FOREIGN PATENT DOCUMENTS

| JP | A-HEISEI 5-257694 | 10/1993 |
| JP | A-HEISEI 6-180773 | 6/1994 |
| JP | A-HEISEI 8-129488 | 5/1996 |
| JP | A-HEISEI 9-297686 | 11/1997 |
| JP | A-HEISEI 10-293756 | 11/1998 |
| JP | A-HEISEI 11-259447 | 9/1999 |
| JP | A-HEISEI 11-316754 | 11/1999 |
| JP | P2000-353095 A | 12/2000 |
| JP | P2001-229026 | 8/2001 |

OTHER PUBLICATIONS

M. K. Warmuth, J. Liao, G. R atsch, M. Mathieson, S. Putta, and C. Lemmem. "Support Vector Machines for active learning in the drug discovery process." Journal of Chemical Information Sciences, 43(2):667-673, 2003., url = "citeseer.ist.psu.edu/warmuth03support. html" }.*

(Continued)

*Primary Examiner*—David R Vincent
*Assistant Examiner*—Lut Wong
(74) *Attorney, Agent, or Firm*—Scully, Scott, Murphy & Presser, P.C.

(57) ABSTRACT

A learning system that can predict a desired result, and can have stable and improved prediction precision is presented. The learning system includes a learning section which learns the learning data using a learning algorithm to generate hypotheses, a storage section containing at least a plurality of un-labeled candidate data, a calculating section which uses the hypotheses to calculate a score for each of the plurality of candidate data, a selecting section that selects desired candidate data based on the calculated scores and a predetermined stochastic selection function, a data updating section which affixes a user-determined label to the desired candidate data and outputs the desired candidate data to the learning data, and a control unit which outputs the hypotheses to an output unit when an end condition is met, so that a desired result is predicted.

5 Claims, 7 Drawing Sheets

OTHER PUBLICATIONS

Leo Breiman "Bagging Predictors", Machine Learning, vol. 24, No. 2, pp. 123-140, 1996 url = "citeseer.ist.psu.edu/breiman96bagging.html".*
Hiroshi Manitsuka ("Empirical Evaluation of Ensemble Feature Subset selection Methods for Learning from a High-Dimensional Database in Drug Design" BIBE Mar. 2003).*
Japanese Laid Open Patent Application JP-A-Heisei 11-316754.
"Query by Committee" by Seung, et al.
"Support Vector Machines for Active Learning in the Drug Discovery Process" by Warmuth et al.
Japanese Laid Open Patent Application JP-P2001-229026.
"Bagging Predictors" by Breiman.
"A decision-thoretic generalization of on-line learning and an application to boosting" by Freund.
"The Random Subspace Method for Constructing Decision Forests" by Ho.
Japanese Laid Open Patent Application JP-A-Heisei 5-257694.
Japanese Laid Open Patent Application JP-A-Heisei 6-180773.
Japanese Laid Open Patent Application JP-A-Heisei 8-129488.
Japanese Laid Open Patent Application JP-A-Heisei 9-297686.
Japanese Laid Open Patent Application JP-A-Heisei 10-293756.
Japanese Laid Open Patent Application JP-A-Heisei 11-259447; and.
Japanese Laid Open Patent Application JP-P2000-353095A.
"Query by Committee" by Seung, et al., (Proceedings of the fifth annual ACM workshop on calculational learning theory of the international conference of the publication, 1992, pp. 287-294.
"Support Vector Machines for Active Learning in the Drug Discovery Process" by Warmuth et al., (Journal of Chemical Information Sciences, vol. 43, 2, 2003, pp. 667-673).
"Bagging Predictors" by Breiman, (Machine Learning, vol. 24, No. 2, 1996, pp. 123-140).
"A decision-thoretic generalization of on-line learning and an application to boosting" by Freund, (Proceedings of the second European conference on calculational learning theory, 1995, pp. 23-37).
"The Random Subspace Method for Constructing Decision Forests" by Ho, (IEEE Transactions on Pattern Analysis and Machine Intelligence, vol. 20, No. 8, 1998, pp. 832-844).
Naoki et al., "Active Learning and Discovery Science", Discovery Science and Data Mining First Edition, Apr. 14, 2000, pp. 64-72.
Fukumizu, "Active Learning in Neural Networks", Journal of IPSJ, Jul. 1997, pp. 569-575, vol. 38, No. 7.
Mamitsuka et al., "Active Ensemble Learning- Applications to Data Mining and Bioinformatics", 2002, pp. 717-724, vol. J85, No. 5.

* cited by examiner

ENSEMBLE LEARNING SYSTEM AND METHOD

BACKGROUND OF THE INVENTION

1. Field of the Invention

The present invention relates to a learning system used to learn learning data.

2. Description of the Related Art

Both active learning and knowledge discovery are known as learning methods of learning data using a learning algorithm executed as a computer program. Active learning is a learning method in which effective data is actively shown, in addition to passive learning of the learning data, to improve precision. A method of using conventional active learning or a method of using selective sampling are disclosed in Japanese Laid Open Patent Application (JP-A-Heisei 11-316754), in "Query by Committee" by Seung et al., (Proceedings of the fifth annual ACM workshop on calculational learning theory of the international conference of the publication, 1992, pp. 287-294), and in "Support Vector Machines for Active Learning in the Drug Discovery Process" by Warmuth et al., (Journal of Chemical Information Sciences, Vol. 43, 2, 2003, pp. 667-673). In the conventional active learning technique, candidate data with the most data, or the largest number of data values or data points, is selected and is predicted as a data in a boundary. Also, knowledge discovery is a technique in which re-learning is carried out based on given learning data. A method of using the conventional knowledge discovery is disclosed in Japanese Laid Open Patent Application (JP-P2001-229026). This conventional knowledge discovery selects and uses a candidate data with the most data points.

In the learning method (active learning and knowledge discovery), a class or a label containing a function value is used. The class shows the existence or non-existence of a state of an event, and the function value uses a numerical value to show a state of an event. With active learning, the label is set to or associated with the learning data and the selected candidate data, and with knowledge discovery, the label is set to or associated with the learning data and the candidate data.

When the learning data is learned, ensemble learning is sometimes carried out. The ensemble learning is a technique in which a plurality of hypotheses are generated from a given learning data to improve the precision of the passive learning, and these hypotheses are integrated. As typical ensemble learning techniques, "bagging" and "boosting" are known, and are disclosed in "Bagging Predictors" by Breiman (Machine Learning, Vol. 24, No. 2, 1996, pp. 123-140), and "A decision-thoretic generalization of on-line learning and an application to boosting" by Freund, (Proceedings of the second european conference on calculational learning theory, 1995, pp. 23-37).

When the learning data is learned, an attribute selection is sometimes carried out. The attribute selection is a technique in which the attribute of the learning data is selected to reduce the dimension of the learning data so that precision is improved. The attribute selection is disclosed in "The Random Subspace Method for Constructing Decision Forests" by Ho, (IEEE Transactions on Pattern Analysis and Machine Intelligence, vol. 20, No. 8, 1998, pp. 832-844). In this conventional technique, whether each attribute should be selected is determined based on a predetermined probability so that the number of attributes is reduced.

However, there are the following problems in the conventional techniques in which the learning data is learned.

The first problem is that a desired result cannot be predicted. For example, it is not possible to carry out the learning (active learning and knowledge discovery) efficiently when the candidate data is unbalanced data or data of different values. For example, the unbalanced data are data in which a distribution of data is shifted from a uniform distribution when attention is paid on the label (class and function value), and for example, the number of data is different between the classes. Also, the data of the different values are a data when a cost determining the label of the data (class and function value) is different and when data with a specific label (class or function value) is valuable. The data of the different values are used for extracting a high value data.

The reason for the first problem is as follows. That is, the candidate data with a lesser data quantity is not selected when the candidate data with the most data quantity is selected. Therefore, various types of candidate data cannot be obtained to belong to the label of the learning data (class or function value) and it is becomes difficult to learn based on the learning algorithm. To prevent this situation, a cost could be set to the learning algorithm or the candidate data could be increased or decreased. However, it is difficult to determine an appropriate cost and the increase or decrease of the appropriate candidate data before the learning. When the values of the candidate data are different, the learning system which can predict a desired result by selecting the candidate data of the highest value is needed.

The second problem is that the prediction precision is not stable. The reason for the second problem is that a criterion to select the candidate data is previously determined (i.e., to select the candidate data with the most data values). Therefore, the selected candidate data are biased and the hypothesis is not generated to reflect the whole candidate data.

The third problem is that the prediction precision is not improved if an appropriate selection probability is predetermined when an attribute selection is carried out for the above-mentioned ensemble learning. The reason for the third problem is that when the probability of the attribute selection is predetermined to be 0.5, the number of the selected attributes becomes approximately half. However, in actuality, when there are many unnecessary attributes, the probability of the attribute selection is not 0.5. It is difficult to determine the appropriate number of attributes before the learning. Also, it takes a long time for the calculation, and the calculation cost becomes enormous if the number of the attributes is determined based on the calculation (the selection probability) while learning.

The above-mentioned problems will be described, using the screening of a new medicine as an example. In case of the screening of the new medicine, for example, a class shows the existence or non-existence of the combination of some compound as the existence or non-existence of the state of some phenomenon. A function value shows a combination ability of a compound in a numerical value as the size of a state of some phenomenon.

In the screening of the new medicine, the number of active compounds (positive examples) is very few, compared with the number of inactive compounds (negative examples). Therefore, if the candidate data with the most data quantity is selected, many inactive compounds are selected and various active compounds are not selected, as illustrated in the above second problem.

Also, in order to discover the active compound as a medicine candidate through the experiment, it is important to discover the active compound in the least number of times of the experiment. It is not possible to learn (for example using either active learning or knowledge discovery) efficiently in the case of the criterion of the most data quantity, as indicated in the above first problem. Therefore, there is a case that the better hypothesis cannot be generated (to predict a desired result).

In conjunction with the above description, a fuzzy knowledge acquiring apparatus is disclosed in Japanese Laid Open Patent Application (JP-A-Heisei 5-257694). In the fuzzy knowledge acquiring apparatus of this conventional example, classification rules with fuzziness are acquired as determination trees expressed with nodes and links from a training case group in which many training cases containing assigned attributes and classification results are collected and a fuzzy set which expresses the attributes is calculated. An initial node producing section adds a conviction degree to each of the training cases given from the training case group and outputs all of them as one node. A process stack stores the node from the initial node producing section. A node taking-out section takes out or removes the non-processed node that can still be divided of the nodes stored in the process stack as the node of a process object. A node evaluation section determines whether the removed node should be divided, and separates this removed node into a part of the node not to be divided and a part of the node to be divided. An end stack stores the node part not to be divided from the node evaluation section. A division attribute selection section takes the node part to be divided from the node evaluation section, determines whether the attribute contains a numerical value and a fuzzy value based on attribute values written in the training cases which are contained in the removed node, calculates a mutual data quantity when the node part is divided with the attribute, based on a summation of the conviction degrees of the training cases which are coincident with attribute values as items, if the attribute does not contain the numerical value and fuzziness as the attribute value, calculates a mutual data quantity when the node part is classified with this attribute, based on a belonging degree to the item, if the attribute contains the numerical value and the fuzziness as the attribute value, and selects the attribute giving a maximum mutual data quantity. A node dividing section stores the removed node which is selected by the division attribute selection section in the end stack, generates a new node as a fuzzy subset based on the item of the selected attribute and stores it in the process stack. A determination tree generating section generates a diagram showing classification codes based on the node stored in the end stack.

A pattern recognition apparatus is disclosed in Japanese Laid Open Patent Application (JP-A-Heisei 6-180773). In this conventional example, the pattern recognition apparatus recognizes a character pattern or an image pattern inputted to an input section. A pattern analysis section analyzes the similarity of a learning pattern to the input pattern inputted to the input section. A hypothesis pattern generating section generates a pattern near the input pattern inputted to the input section as a hypothesis. A comparing section compares the input pattern and the hypothesis pattern generated by the hypothesis pattern generating section. The comparison result determined by the comparing section and an analysis result determined by the pattern analysis section are described in an attribute description area. An estimating section refers to the description of the input pattern described in the attribute description area, carries out control to change an operation of the pattern analysis section based on the referred to description, to start the hypothesis pattern generating section, and to produce a final determination result from the final contents of the attribute description area, and sends a result to another apparatus.

An inference method is disclosed in Japanese Laid Open Patent Application (JP-A-Heisei 8-129488). In this conventional example, the inference method executes using a set of rules in a condition section in which a condition necessary to infer is generally described, and a conclusion section in which a conclusion corresponding to the condition is described. In a rule extraction process, the rule having the condition matching a given or input data is extracted. The case corresponding to the extracted rule is extracted in a case extraction process. The similarity with the input data is evaluated based on the extracted rule and the extracted case in an evaluation process. One of the rules or the cases which has a higher degree of similarity with the input data is selected in a selection process. An inferring operation is executed based on the result section of the selected case or the conclusion section of the selected rule.

A data mining apparatus is disclosed in Japanese Laid Open Patent Application (JP-A-Heisei 9-297686). In this conventional example, the data mining apparatus contains a correlation rule generation section which generates a correlation rule between attributes of data in a database based on selection criterion data in which a support degree and a conviction degree as criterion for selection of correlation rules are stored. A job knowledge base is a set of correlation rules whose effectiveness is previously confirmed. A hypothesis correlation rule generation section generates hypothesis correlation rules as hypotheses of the correlation rules from the job knowledge base and the correlation rules generated by the correlation rule generation section. A hypothesis correlation rule verification section checks a probability that the data of the database matches the hypothesis correlation rule generated by the hypothesis correlation rule generation section, and adopts the hypothesis correlation rule, if its probability is above the conviction degree of the selection criterion data, as a supplemental correlation rule.

A combination optimizing method is disclosed in Japanese Laid Open Patent Application (JP-A-Heisei 10-293756). In this conventional example, when a search is carried out based on a simulated annealing method, various evaluation values to each adjacent solution generating function which is used for the search are stored in an adjacent solution selection function evaluation value storage section provided on a storage device. The evaluation values are updated one after another, according to the progression of the search. Thus, the evaluation values of each function can be dynamically provided from the initial step of the search to the final step. By using these values, the selection probability of each function is determined, and a search method can be selected according to the state of progress of the search.

An attribute selector is disclosed in Japanese Laid Open Patent Application (JP-A-Heisei 11-259447). In this conventional example, an object is expressed with a string of attribute values to attributes expressed by symbols. A plurality of cases are given in such a way that a special attribute, referred to as a class, and a discrete value as a label which is an attribute value of the special attribute, are allocated to the string of attribute values. A part of the string of attribute/attribute values is selected to generate a new case in a recursive concept learning apparatus which requires the description to define a necessary and sufficient condition that the class is a specific label. A separating section separates, into two subsets, a plurality of cases to be given to the recursive concept learning apparatus. A first section calculates a conditioned probability that the class is the specific label when an attribute takes a specific attribute value in each subset. A second section calculates a difference between the probabilities through a weighted average based on respective generation frequency for each of the label and the attribute value. A determination section determines the usefulness of the attribute based on the weight-averaged values of the attribute values of the attributes.

An experiment planning method is disclosed in Japanese Laid Open Patent Application (JP-A-Heisei 11-316754). In this conventional example, an inference is carried out based on input/output data obtained through experimentation to determine a correct or approximate "function relation" between input and output. At the time of selection of input/output points of the next experiment, input/output data is learned by a lower level algorithm as training data by using a predetermined learning algorithm to infer a function relation from past input/output data using a predetermined expression form as the lower level algorithm, in a learning process. The learning precision in the learning process is improved by a boosting technique in a boosting process. Function values for input candidate points randomly generated are predicted by using a final hypothesis obtained as an average with weighting of a plurality of hypotheses in the boosting process. An input candidate point that has the smallest difference between a weighted summation of output values in which a summation of weights is maximum, and a weighted summation of output values in which a summation of weights is next maximum, is selected as the input point.

A method of knowledge discovery is disclosed in Japanese Laid Open Patent Application (JP-2000-353095A). In this conventional example, a knowledge having a condition section of a series of tests, and a conclusion section is extracted from a set of cases. A prediction precision of each knowledge is predicted based on precision of the knowledge which has the condition section from which a part of the series of tests is removed and precision of the knowledge which has the part of the series of tests in the condition section. The unexpected situation level of the knowledge is evaluated based on the difference between the actual precision and the predicted precision. Only the knowledge which have the unexpected situation level higher than a predetermined level are shown.

A knowledge discovery system is disclosed in Japanese Laid Open Patent Application (JP-2001-229026A). In this conventional example, high level knowledge is extracted by loading data sampled from a data base, stored in large-scaled data storage, into a main memory of a computer. An input section inputs a learning algorithm and data to be learned by the learning algorithm. A learning section controls the learning algorithm to learn a plurality of partial data sets produced from the data stored in the main memory through sampling as training data to obtain a plurality of hypotheses. A data selection section predicts function values to a plurality of sample candidate points read out from the large-scaled data storage by using the plurality of hypotheses, estimates data quantities of the sample candidate points based on the predicted values, selects one or more candidate points with larger data quantities, and adds the selected points to the main memory. A control section controls the learning section and the data selection section to repeat the selective data storage and knowledge discovery until a predetermined stop condition is met, and stores a plurality of resultant hypotheses in the main memory as final hypotheses. A predicting section predicts a label value of data with an unknown label inputted to the input section through an average, or an average with weighting, of the plurality of hypotheses.

SUMMARY OF THE INVENTION

An object of the present invention is to provide a learning system which can predict a desired result.

Another object of the present invention is to provide a learning system in which prediction precision is stable.

Another object of the present invention is to provide a learning system in which a prediction precision can be improved.

In an embodiment of the present invention, a learning system and method includes an input section which inputs or obtains learning data to which labels are set, as well as an end condition. The system also includes a learning section which learns the learning data using a learning algorithm to generate hypotheses, and a plurality of candidate data to which no label has been assigned, the data being stored in a storage section. A calculating section refers to the storage section and calculates a score for each of the plurality of candidate data by using the hypotheses, and a selecting section selects desired candidate data from among the plurality of candidate data based on the calculated scores. A setting section sets a label determined by a user to the desired candidate data, and a data updating section adds the desired candidate data to the learning data and outputs to the learning section. A control unit outputs the hypotheses generated by the learning section to an output unit when the end condition is met.

Here, the selecting section has a predetermined selection function to select the desired candidate data from among the plurality of candidate data. In this case, the selection function is a function which decreases exponentially.

In another embodiment of the present invention, the learning section learns the learning data through an ensemble learning by using a learning algorithm to generate hypotheses. The calculating section carries out an averaging with weights to the plurality of hypotheses, refers to the storage section and calculates a score for each of the plurality of candidate data by using the hypotheses.

Here, the learning section re-samples the learning data to generate partial data by the ensemble learning, and re-samples an attribute of the learning data to generate a partial attribute, and learns the learning data based on the partial data and the partial attribute.

In another embodiment, the learning system includes an input section which inputs learning data to which labels are set, along with an end condition. The selecting section selects a desired candidate data from among the plurality of candidate data based on the calculated scores, and the data updating section outputs the desired candidate data as the learning data to the learning section.

In another embodiment, the learning system includes an input section which inputs learning data to which labels are set, and the learning section learns the learning data through an ensemble learning by using a learning algorithm to generate hypotheses. A plurality of candidate data to which no label has been assigned are stored in a storage section. The calculating section carries out an averaging with weights to the plurality of hypotheses, refers to the storage section and calculates a score for each of the plurality of candidate data by using the hypotheses. The setting section sets or assigns a label determined by a user to the desired candidate data, and the data updating section outputs the desired candidate data as the learning data to the learning section.

In another embodiment, the present invention relates a computer-readable software product for realizing a learning method of a learning data with a label set by using a computer which comprises an input unit, a processor, a storage section, and an output unit. The learning method is achieved by (a) the processor inputting or obtaining the learning data and an end condition in response to an operation of the input unit by a user; by (b) the processor generating a hypothesis through learning of the learning data by using a learning algorithm, wherein a plurality of candidate data with no label are stored in the storage section; by (c) the processor calculating a score for each of the plurality of candidate data by using the hypothesis by referring to the storage section; by (d) the processor selecting a desired candidate data from among the plurality of candidate data based on the calculated score; by (e) the processor setting a label determined by the user to the desired candidate data selected in response to an operation of the input unit by the user; by (f) the processor carrying out the (b) step by adding the desired candidate data to the learning data; by (g) the processor carrying out the (c) step, the (d) step, the (e) step and the (f) step when the end condition is not met; and by (h) the processor outputting the hypothesis generated in the (f) step to the output unit when the end condition is met.

In another embodiment, the processor in (b) generates a hypothesis through learning of the learning data through an ensemble learning by using a learning algorithm.

In another embodiment, in step (b) the processor generates a hypothesis through learning of the learning data by using a learning algorithm, wherein a plurality of candidate data with label are stored in the storage section, and in step (f) the processor carries out the (b) step by outputting the desired candidate data as the learning data.

In another embodiment, in step (b) the processor generates a hypothesis through learning of the learning data through an ensemble learning by using a learning algorithm, wherein a plurality of candidate data with label are stored in the storage section.

DESCRIPTION OF THE PREFERRED EMBODIMENTS

Hereinafter, a learning system of the present invention will be described in detail with reference to the attached drawings.

First Embodiment

Figure 1:
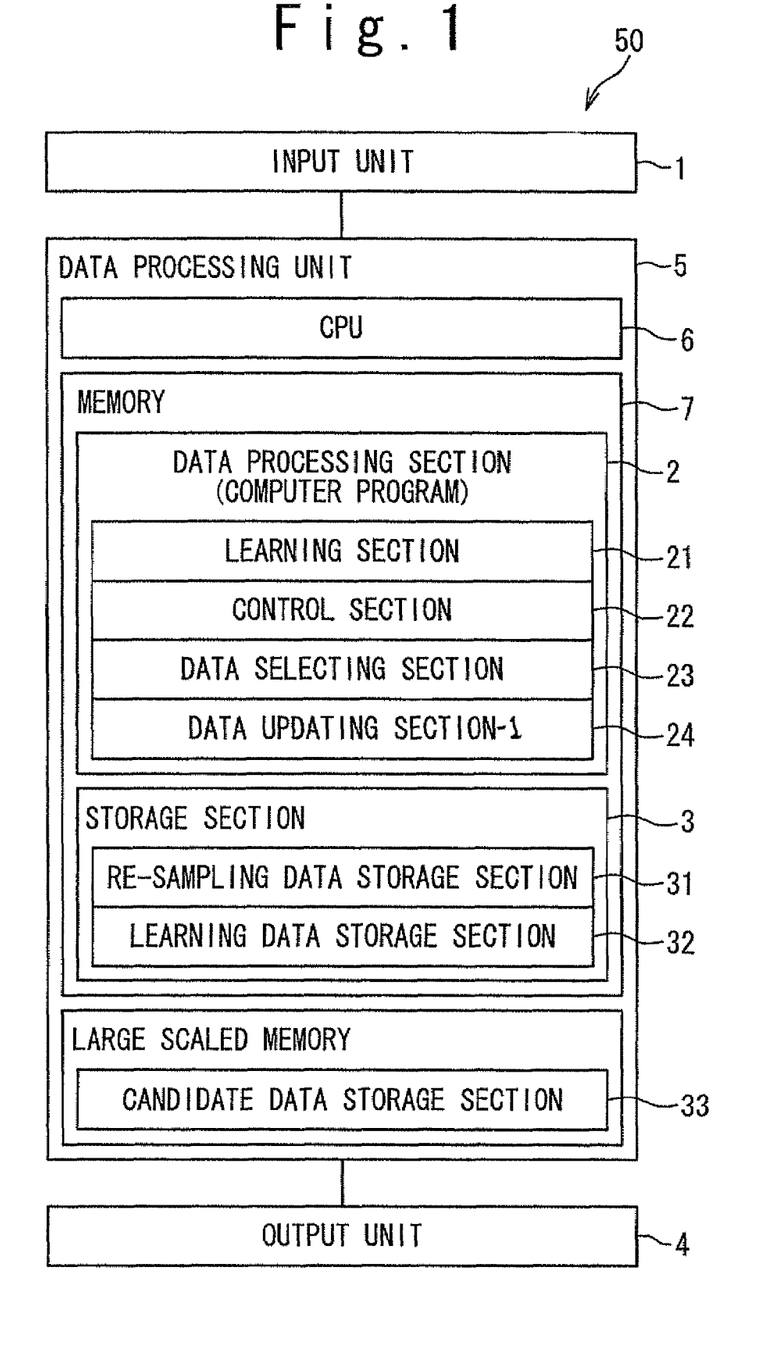
FIG. 1 is a block diagram showing the configuration of an active learning system as a learning system according to the first embodiment of the present invention.

FIG. 1 is a block diagram showing the structure of an active learning system 50 as the learning system according to the first embodiment of the present invention. The active learning system 50 of the present invention is composed of an input unit 1, a data processing unit 5 and an output unit 4. The data processing unit 5 is a computer, and the input unit 1 and the output unit 4 are connected with the data processing unit 5. The output unit 4 is, for example, a display unit or a printer.

The data processing unit 5 is composed of a CPU (Central Processing Unit) 6, a memory 7 and a large scaled memory which has a capacity more than the memory 7. A data processing section 2 and a storage section 3 are realized by a computer program stored in the memory 7 and executed by the CPU 6. The data processing section 2 is composed of a learning section 21 as a learning program, a control unit 22 as a control program, a data selecting section 23 as a data selection program and a data updating section-1 24 as a data updating program. The control unit 22 is a program which controls the learning section 21, the data selecting section 23, and the data updating section-1 24. The storage section 3 is composed of a re-sampling data storage section 31, and a learning data storage section 32. The re-sampling data storage section 31 is used when ensemble learning is carried out. Also, the candidate data storage section of the above large scaled memory is referred to as a candidate data storage section 33.

Figure 2:
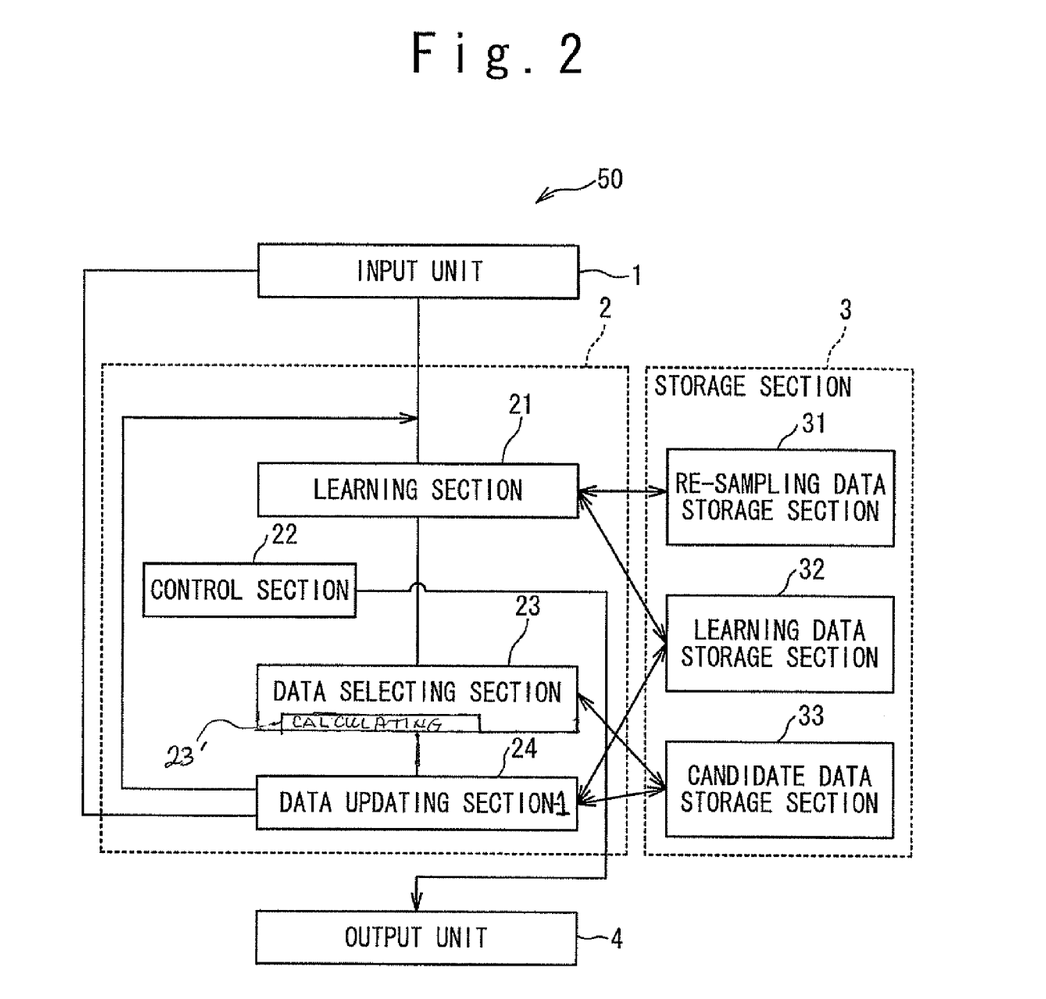
FIG. 2 is a diagram showing the function logic of FIG. 1.

FIG. 2 is a diagram showing function logic of FIG. 1.

In response to an operation of the input unit 1 by the user, the learning section 21 of the data processing section 2 inputs a learning data, a lower level learning algorithm and an end condition. The learning data is a data which includes a label value or attribute, that is, data for which a label, i.e. a class or function value, is set. The details of the learning data will be described below. The lower level learning algorithm is a computer program to carry out the active learning. The learning section 21 stores an inputted learning data and the end condition in the learning data storage section 32. In this embodiment, the lower level learning algorithm is inputted with the learning data and the end condition, but this algorithm may have been previously stored in the learning data storage section 32.

The learning section 21 carries out a learning process using the lower level learning algorithm. When the re-sampling of the learning data and attribute selection are carried out in the ensemble learning, the learning section 21 performs the ensemble learning using the lower level learning algorithm. In the ensemble learning, the learning section 21 re-samples the learning data and generates partial data, and re-samples the attributes of the learning data and generates a partial attribute and stores the re-sampled data which contains the partial data and the partial attribute in the re-sampling data storage section 31. The details of the re-sampling and hypothesis will be described below. The learning section 21 accesses the re-sampling data storage section 31 and learns the learning data based on the re-sampling data and generates hypotheses. In this embodiment, when a program is produced such that the re-sampling is realized based on the lower level learning algorithm, the re-sampling data storage section 31 may be omitted.

When the ensemble learning is carried out, the learning section 21 repeats the above learning process for the predetermined number of times and acquires a plurality of hypotheses.

A plurality of candidate data are stored in the candidate data storage section 33. Each of the plurality of candidate data is a data for which the label (the class or the function value) is not set. In this embodiment, the plurality of candidate data are previously stored in the candidate data storage section 33 and can be updated and changed. Also, the plurality of candidate data may be inputted together with the learning data, the lower level learning algorithm and the end condition.

In this embodiment, the candidate data storage section 33 is provided for the data processing unit 5 as large-scaled memory, separated from the memory 7. However, when the amount of the candidate data is small, the candidate data may be stored in the memory 7 because the CPU 6 can process memory 7 at high speed. In this case, the storage section 3 of the memory 7 may contain the candidate data storage section 33.

The data selecting section 23 of the data processing section 2 carries out a data selecting process. In the data selecting process, the data selecting section 23 performs an averaging with weighting of the plurality of hypotheses generated by the learning section 21. The data selecting section 23 includes a calculating section 23' which accesses the candidate data storage section 33 and calculates a score for each of the plurality of candidate data using the plurality of hypotheses. The data selecting section 23 selects a desired candidate data from among the plurality of candidate data based on the calculated score. A previously set selection function is written in the data selecting section 23 (data selection program) to select the desired candidate data from among the plurality of candidate data. The details of selection of the desired candidate data using the selection function will be described below.

The data updating section-1 24 of the data processing section 2 carries out a data updating process. In the data updating process, the data updating section-1 24 outputs the desired candidate data selected by the data selecting section 23 to the output unit 4. The user determines the label (class or function value) of the desired candidate data selected by the data selecting section 23 through experiments and so on. Through the operation of the input unit 1 by the user, the data updating section-1 24 sets the label (class or function value) determined by the user for the selected desired candidate data. The data updating section-1 24 adds the selected desired candidate data to the learning data, outputs it to the learning section 21, and deletes the desired candidate data stored in the candidate data storage section 33.

The control unit 22 of the data processing section 2 accesses the learning data storage section 32, and controls the learning section 21, the data selecting section 23, and the data updating section-1 24 to execute the above-mentioned processes when the end condition is not met. The control unit 22 accesses the learning data storage section 32 and outputs the plurality of hypotheses generated by the learning section 21 to the output unit 4 when the end condition is met.

The above-mentioned learning data will be described next. It is assumed that the learning data input to the data processing unit 5 from the input unit 1 is S, and the number of data is m (m is an integer equal to or greater than one). In one embodiment, the learning data S for which a label (class or function value) is set is shown as the following equation (1).

$$S=\{(x_1,y_1), (x_2,y_2), \ldots, (x_i,y_i), \ldots, (x_m,y_m)\} \quad (1)$$

where $x_i$ is an input value and $y_i$ is an output value. For example, if developing a new medicine, $x_i$ is an expression of compound and $y_i$ is existence or non-existence of activity. The value $y_i$ may be $y_i \in \{0, 1\}$, a set of optional classes or a set of optional function values. In this positive example, in order to make the description simple, it is assumed that $y_i \in \{0, 1\}$. Also, it is assumed that a class with a smaller data quantity or a class of a higher value is a positive example of the output=1. An example of such cases will be described below. However, the present invention can be applied to a case other than cases in which the plurality of candidate data are unbalanced data and the data are of different values, as mentioned above. Also, the present invention can be applied without losing generality even in a case of many classes or many function values, by allocating one or more classes or function values instead of the output=1. Otherwise, in the case of many classes, by combining classifications of two classes, the whole classification can be realized.

The above-mentioned lower level learning algorithm may be a determination tree, a determination list, a neural network, a Naïve Bayes, Bayesian network, a genetic algorithm, a regression analysis, a support vector machine and so on, if it is an algorithm to learn input and output data using an expression form. Herein, an example will be described in which the bagging is used as the ensemble learning. However, the present invention may be applied to the other ensemble learning such as boosting. When the ensemble learning is carried out, it is assumed that the number of times of re-sampling is T. By repeating the above-mentioned learning process T times, T hypotheses are obtained.

Figure 3:
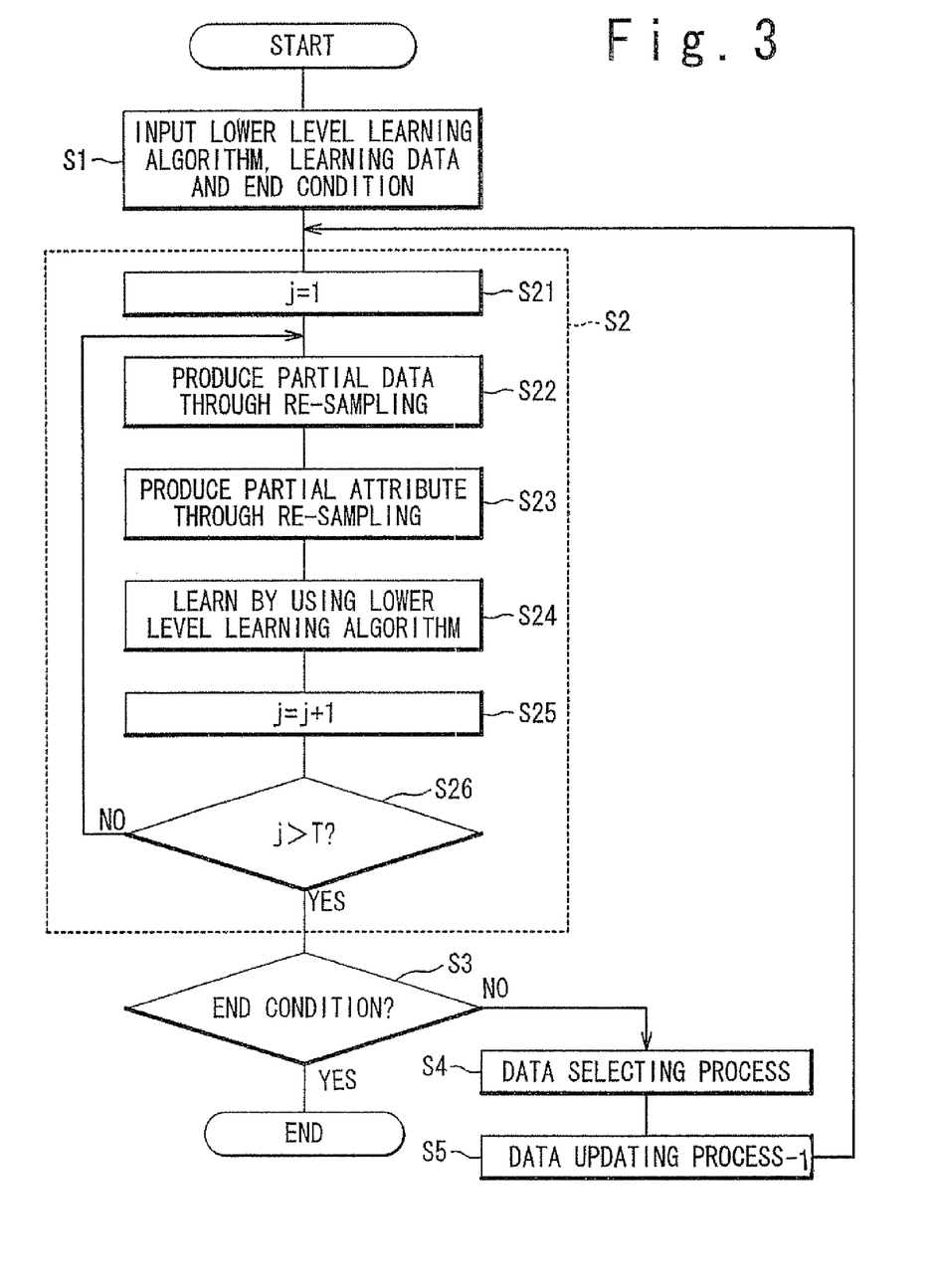
FIG. 3 is a flow chart showing an operation of the active learning system as the learning system according to the first embodiment of the present invention.

Next, the details of ensemble learning as an operation of the active learning system 50 in the present invention will be described. FIG. 3 is a flow chart showing the operation of the active learning system 50 of the present invention.

Through the operation of the input unit 1 by the user, the learning section 21 of the data processing section 2 inputs a learning data, a lower level learning algorithm, and an end condition (Step S1). At this time, the learning section 21 stores the end condition in the learning data storage section 32.

Next, the learning section 21 performs the ensemble learning by applying the lower level learning algorithm to the learning data in the above-mentioned learning process (Step S2). Specifically, first, the learning section 21 stores the learning data in the learning data storage section 32 and sets the number of times j of re-sampling to 1 (Step S21).

Next, the learning section 21 re-samples the learning data through the ensemble learning and generates partial data (Step S22). Here, in the re-sampling, an integer i in a range of 1 to m is randomly generated for the predetermined number of times, e.g. 1 to m, learning data S and the learning data $(x_i, y_i)$ of the integer i is sampled.

Next, the learning section 21 re-samples the attribute of the learning data, as well as the learning data through the ensemble learning, to reduce unnecessary attributes, and generates partial attributes (Step S23). At this time, the learning section 21 stores the re-sampling data containing the partial data and the partial attribute in the re-sampling data storage section 31. However, unlike the learning data, re-sampling data with the same attribute is deleted because the existence of duplicate attributes is insignificant. The re-sampling of the attributes is performed for the predetermined number of times in accordance with a prediction value of an appropriate number of the attributes. When the appropriate number of the attributes cannot be predicted, the re-sampling of the attributes is carried out for the same number of times as the original number of the attributes. It should be noted that the predetermined number of attributes may be pre-selected by using an existing technique prior to this attribute selection, when the number of the attributes is enormous.

Next, the learning section 21 accesses the re-sampling data storage section 31 and learns the re-sampled data of the learning data in accordance with the lower level learning algorithm, and produces a hypothesis (Step S24). The hypothesis is an expression form that a label is outputted for an optional input x.

Next, the learning section 21 increments the re-sampling count (the number of times of re-sampling) j by one (Step S25).

Next, the learning section 21 compares the re-sampling count j and the preset re-sampling count T (Step S26). When the re-sampling count j does not exceed the preset re-sampling count T (T is an integer equal to or greater than one) (step S26=NO), the learning section 21 repeats the steps S22 to S25. When the re-sampling count j exceeds the preset re-sampling count T (step S26=YES), the learning section 21 obtains the T hypotheses.

Next, the control unit 22 of the data processing section 2 accesses the learning data storage section 32 and determines whether or not the process meets the end condition (Step S3). If the end condition is not met (step S3=NO), the control unit 22 controls the data selecting section 23, the data updating section-1 24, the learning section 21 to carry out the data selecting process, the data updating process, and the learning process.

Specifically, when the end condition is not met (step S3=NO), the data selecting section 23 of the data processing section 2 carries out the data selecting process (Step S4). The data selecting process contains a score calculating process and a selecting process.

In the score calculating process of the data selecting process (step S4), the data selecting section 23 carries out an average with weighting to the T hypotheses generated by the learning section 21. The data selecting section 23 accesses the candidate data storage section 33 to calculate a score for each of the plurality of candidate data by using the T hypotheses. The score has a numerical value of a likelihood of the positive example of each candidate data. When the description form is a determination tree, the following equation (2) can be used to indicate that the score is a rate RA of the partial positive example in each leaf of the learning data when the candidate data is classified based on the determination tree.

$$RA = \frac{\sum_{(x_i, y_i) \in S_p^i} w_i^t}{\sum_{(x_i, y_i) \in S^i} w_i^t} \quad (2)$$

where $S^t$ is a set of the learning data classified into the same leaf as the candidate data. The superior (superscript) letter "t" is not a symbol to show a power but a simple symbol. Also, "$S_p^{t}$", of "$S^{t}$" shows a set of learning data which belongs to the class of the positive example and "$w_i^{t}$" shows (the number of inputs ($x_i, y_i$) contained in leaf "t")*weight. For example, in case of a neural network, an output value of the neural network can be used for the score "$w_i^{t}$".

Also, the value obtained by smoothing the rate of the above partial positive example can be obtained by using the following equation (3).

$$RA = \frac{\sum_{(x_i, y_i) \in S_p^t} w_i^t + 1}{\sum_{(x_i, y_i) \in S^t} w_i^t + 2} \quad (3)$$

In the ensemble learning, an average of the scores of the respective hypotheses is used in the case of the bagging, and a value of the weighted score to each hypothesis is used in the case of the boosting.

In the selecting process of the data selecting process (step S4), the data selecting section 23 selects a desired candidate data from among the plurality of candidate data based on the calculated score. It is assumed that the number of the candidate data stored in the candidate data storage section 33 is R (R is an integer equal to or greater than one) and the number of the desired candidate data is B (B is an integer equal to or greater than one). In this case, when the number of the inputted learning data is sufficiently large, i.e., is more than the setting number, the B candidate data are selected from the candidate data with a maximum score, because it is possible that the number of the learning data is sufficiently large so that a deviation would not exist. However, in practice, the number of inputted learning data is less than the number of the candidate data stored in the candidate data storage section 33. Therefore, there is a possibility that the selected candidate data are biased if the candidate data are selected from the candidate data with the maximum score. For this reason, the data selecting section 23 selects desired candidate data based on a selection function that is exponentially decreasing as shown below.

For example, the data selecting section 23 first rearranges the R candidate data stored in the candidate data storage section 33 in the order of larger positive example score (PS). In another approach, the R candidate data may be rearranged in the order of larger value which is obtained by adding a variance or a standard deviation of a positive example score obtained by weighting the positive example score with an appropriate constant number. In yet another approach, the R candidate data may be rearranged in the order of |PS-0.5|. This is the appropriate order in the case of usual active learning as well as in the case of the above-mentioned unbalanced data and the data with different values. The user can specify the arrangement order from the input unit 1 by specifying a parameter of the selection function. Also, a plurality of selection functions may be written in the data selecting section 23 (data selection program), and the user may select one from among the plurality of selection functions from the input unit 1. For example, the user may select the specification of the parameter. When the B desired candidate data are selected, an exponential function $f(z)=A \cdot e^z$ (z is an integer equal to or greater than one) is given as a selection function and the value A shown in the following equation (4) is determined.

$$\int_1^B A * e^z \, dz = R \quad (4)$$

Figure 4:
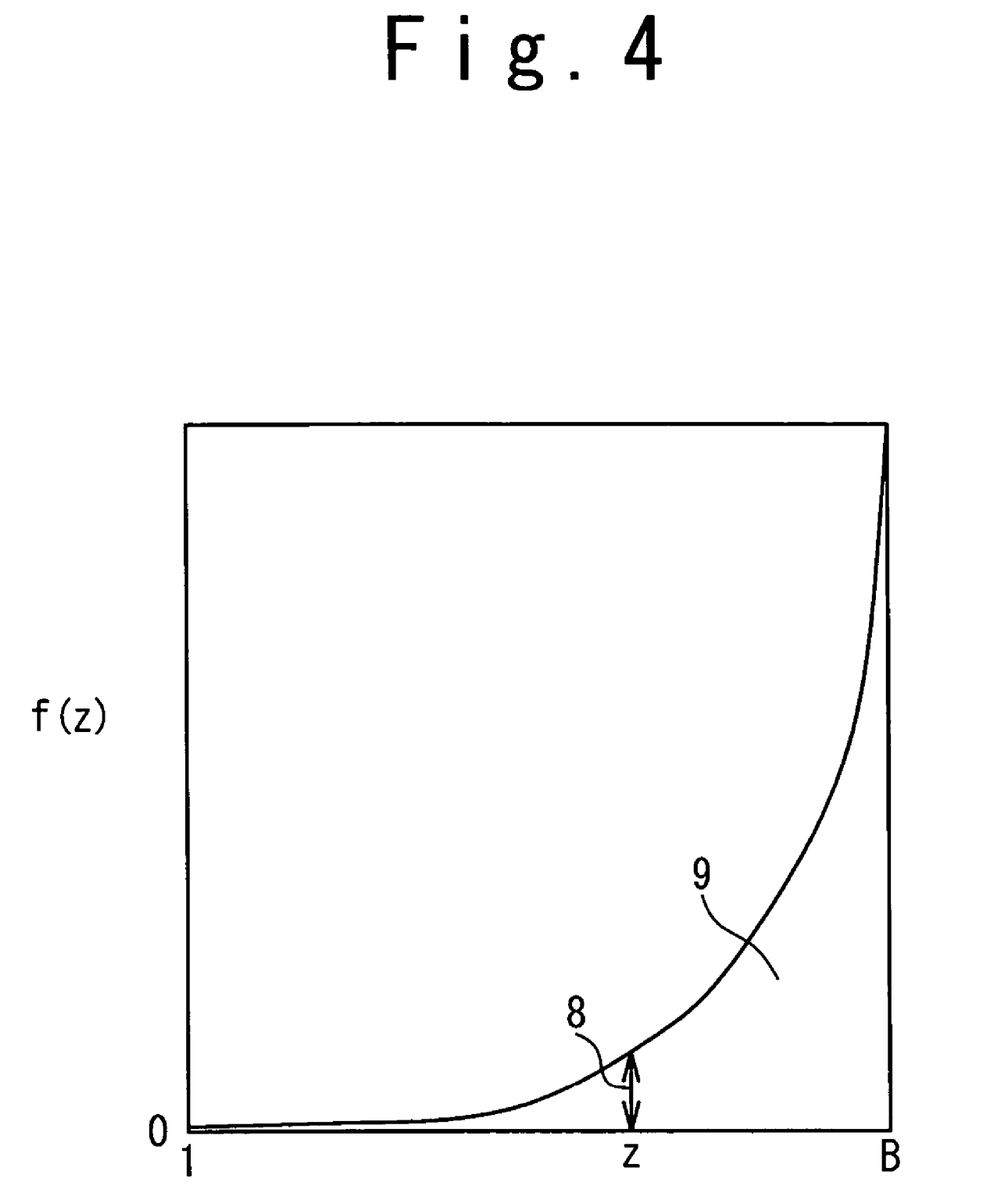
FIG. 4 is a diagram showing a selection function which is applied to the learning system of the present invention.

As shown in FIG. 4, the constant value A is determined by the equation (4) such that the B desired candidate data can be selected from the whole of the R candidate data 9 by selecting the z-th desired candidate data from a predetermined range 8 from 0 to a value of the exponential function f(z). By transforming the equation (4), the constant value A can be determined from the following equation (5).

$$A = \frac{R - B}{e * (e^B - 1)} \quad (5)$$

It is assumed that the data selecting section 23 accesses the R candidate data in order of the score and selects the z-th desired candidate data in the probability of 1/f(z). When the selection probability 1/f(z) is near 1, the candidate data with higher score (containing the maximum score) is selected as the desired candidate data, and when the selection probability 1/f(z) is near 0, the candidate data are sparsely selected as the desired candidate data.

Next, the data updating section 24 of the data processing section 2 carries out the data updating process-1 (Step S5). The data updating process contains a setting procedure and an updating procedure.

In the setting procedure of data updating process-1 (step S5), the data updating section-1 24 outputs the desired candidate data, selected by the data selecting section 23, to the output unit 4. The user determines the label (class or function value) of the desired candidate data through experiments and so on. Through the operation of the input unit 1 by the user, the data updating section-1 24 sets the label (class or function value) determined by the user to the desired candidate data.

In the updating procedure of the data updating process-1 (step S5), the data updating section-1 24 outputs the desired candidate data to the learning section 21 together with the learning data, and deletes the desired candidate data stored in the candidate data storage section 33. After that, the learning section 21 carries out the learning process (step S2).

Next, the control unit 22 accesses the learning data storage section 32 and determines whether or not the end condition is met (Step S3). If the end condition is met (step S3=YES), the control unit 22 outputs the T hypotheses generated by the learning section 21 to the output unit 4 as the final hypotheses. The end condition is one of the (A) condition, the (B) condition, the (C) condition, the (D) condition, and the (E) condition, each of which is described below.

(A) Condition

The end condition is met if a predetermined number of times N of repetition is exceeded.

(B) Condition

The end condition is met if the predetermined number of positive examples are discovered.

(C) Condition

When the learning data is sufficiently large, a part of the learning data is not used for the learning, but is used as evaluation data. The end condition is met if the prediction precision of the evaluation data is higher than a predetermined value.

(D) Condition

For example, in the case of the bagging, the end condition is met if an estimated prediction precision becomes higher than the predetermined value. An estimating method of the prediction precision is carried out for the learning data based on the bagging result of the hypotheses for which the learning data is not used.

(E) Condition

The end condition is met if the estimate precision inclination becomes smaller than a predetermined value.

For example, when the end condition is (A) condition, the control unit 22 sets the number of times of repetition (repetition count) j to one at the step S1 and increments the repetition count j by one when the data updating process-1 is ended (step S5). The control unit 22 compares the repetition count j and the preset repetition count N at the step S3, and outputs the T hypotheses generated by learning section 21 to the output unit 4 when the repetition count j exceeds the preset repetition count N. In the active learning system 50, the number of the learning data S increases (B*j) by (B*j) if the end condition is not met.

The ensemble learning as the operation of the active learning system 50 of the present invention will be described. However, when the ensemble learning is not carried out, the above-mentioned steps S21 to S23, S25, and S26 are unnecessary. In this case, because a single hypothesis is generated by the learning section 21 at the step S2, it is not necessary that the data selecting section 23 perform the averaging with the weighting to the hypothesis generated by the learning section 21 in the score calculating process of the data selecting process (step S4). Also, the learning based on the lower level learning algorithm can be carried out independently when the bagging is used as the ensemble learning. Thus, the processes can be carried out in parallel if desired.

Also, when it is not necessary to remove the unnecessary attributes in the learning data because there are few attributes, or all attributes are assumed to be important, the above-mentioned step S23 can be omitted.

Next, the effect of the active learning system 50 of the present invention will be described.

According to the active learning system 50 of the present invention, when the active learning is carried out, the desired result can be predicted. For example, when the plurality of candidate data are the unbalanced data or data having different values, the active learning can be carried out efficiently.

When the plurality of candidate data are the unbalanced data, the active learning system 50 of the present invention calculates a score for each of the plurality of candidate data by using the hypothesis, and selects the desired candidate data from among the plurality of candidate data based on the calculated scores. Therefore, the candidate data with a smaller data quantity, or less data, can be selected, and it is possible to acquire various types of candidate data which belong to the label (class or function value) of the learning data. Therefore, better hypotheses can be generated and a desired result can be estimated.

When the plurality of candidate data are data of different values, the active learning system 50 of the present invention calculates a score for each of the plurality of candidate data by using the hypothesis, and selects the desired candidate data from among the plurality of candidate data based on the calculated scores. Therefore, the candidate data having high value can be selected and various types of candidate data which belong to the label (class or function value) of the learning data can be acquired. Therefore, better hypotheses can be produced and a desired result is predicted.

In the active learning system 50 of the present invention, when the desired candidate data is selected from among the plurality of candidate data, it is not always necessary to select the candidate data having the largest quantity of data. In the active learning system 50 of the present invention, the selection function (e.g. exponential function) is used as the technique to select the desired candidate data containing the unbalanced data or the data of different values. Therefore, the data is uniformly selected from a data space and the instability of a solution can be prevented. When only the candidate data with larger scores are selected although the amount of the learning data is small, the negative example is partially lacking in the determination tree, and a correct hypothesis cannot be generated. It is desirable to use the selection function to select the desired candidate data containing the unbalanced data or the data of different values from among the plurality of candidate data.

According to the active learning system 50 of the present invention, when the active learning is carried out, the prediction precision to predict a desired result becomes stable.

In the active learning system 50 of the present invention, the criteria to select the desired candidate data are not previously determined and it is not always possible to select the candidate data with the most data or largest quantity of data. Therefore, the selected candidate data or the desired candidate data are never biased. In other words, if the predetermined score is selected when the learning progresses in a degree and the scores to the candidate data become similar, there is a possibility that only the data of a partial tree in a determination tree is selected. However, in the active learning system 50 of the present invention, because the candidate data are stochastically selected, the selected candidate data are dispersed appropriately and the selected data (the selected candidate data) are never biased. Also, the data are uniformly selected from the data space and the instability of a solution can be prevented. Therefore, the hypotheses can be generated to reflect the whole or all of the candidate data, and the prediction precision is stable.

According to the active learning system 50 of the present invention, when the attribute selection is carried out in the ensemble learning of the active learning, the prediction precision is improved in the prediction of the desired result.

In the active learning system 50 of the present invention, the attributes of the learning data are re-sampled, in addition to the re-sampling of the learning data. Thus, it is possible to exclude the unnecessary attributes. Also, even if some optimal selection probabilities dependent on the unnecessary attributes and the data are present, the prediction precision can be improved. Also, because the number of the attributes becomes smaller, improving the calculation efficiency, the prediction precision is also improved. When the re-sampling is carried out the same number of times as the original number of the attributes, about 60 percent of the attributes are selected on average. However, it is possible to spread a data range more widely than a case in which 50 percent of the attributes are randomly selected, like the above-mentioned conventional technique.

In this way, in the active learning system 50 of the present invention, the learning data is learned using the partial data and the partial attributes after exclusion of unnecessary attributes, and the plurality of hypotheses are generated. In this case, the desired result can be more quickly predicted than the conventional technique and the prediction precision is improved.

In the active learning system 50 of the present invention, when a determination tree or a regression tree is used in the lower level learning algorithm for the unbalanced data or the data of different values, a rate of the positive examples in a leaf or a smoothed value is used in the calculation of the scores, such that the desired candidate data contains the unbalanced data or the data of different values. For this reason, according to the active learning system 50 of the present invention, by considering the unbalanced data and the data of different values, the better hypotheses can be generated, and a desired result can be predicted.

Next, the operation of the active learning system 50 of the present invention will be described by using a specific example. As the active learning system 50 of the present invention, a case in which an activated compound is searched from the candidate data storage section 33 for new medicine screening will be described. In this case, the active compound is equivalent to a positive example of a high value in the smaller amount of data and an inactive compound is equivalent to the negative example of the low value in a large amount of data. Also, the lower level learning algorithm is an algorithm to learn a determination tree, and it is assumed that the bagging is carried out as the ensemble learning.

At step S1, the learning section 21 receives (1) the learning data in which existence or non-existence of activation is made clear, (2) the algorithm (the lower level learning algorithm) to learn the determination tree, and (3) the end condition. Also, in the learning process (at step S2), the learning section 21 learns the current learning data, i.e., a plurality of partial samples generated from the learning data through the sampling based on the lower level learning algorithm of the determination tree, and acquires a plurality of determination trees.

Next, the control unit 22 determines whether the end condition is met at step S3 and outputs the plurality of acquired determination trees to the output unit 4 and then ends the control.

If the end condition is not met, the data selecting section 23 calculates a score of the positive example of each of the plurality of determination trees for the plurality of candidate data stored in the candidate data storage section 33 by the above-mentioned technique, and calculates an average of these scores in the data selecting process (step S4). The desired candidate data is selected in accordance with the selection function which is predetermined in accordance with the scores for the plurality of candidate data.

When the label of the selected desired candidate data is determined through activity experiments on a compound, the data updating section-1 24 assigns the label inputted or obtained from the input unit 1 to the desired candidate data in the data updating process-1 (step S5). The data updating section-1 24 adds the selection data (desired candidate data), including the label, to the learning data, and deletes the selection data from the candidate data storage section 33. The learning section 21 continues the active learning by using the learning data to which the desired candidate data has been added.

Second Embodiment

Figure 5:
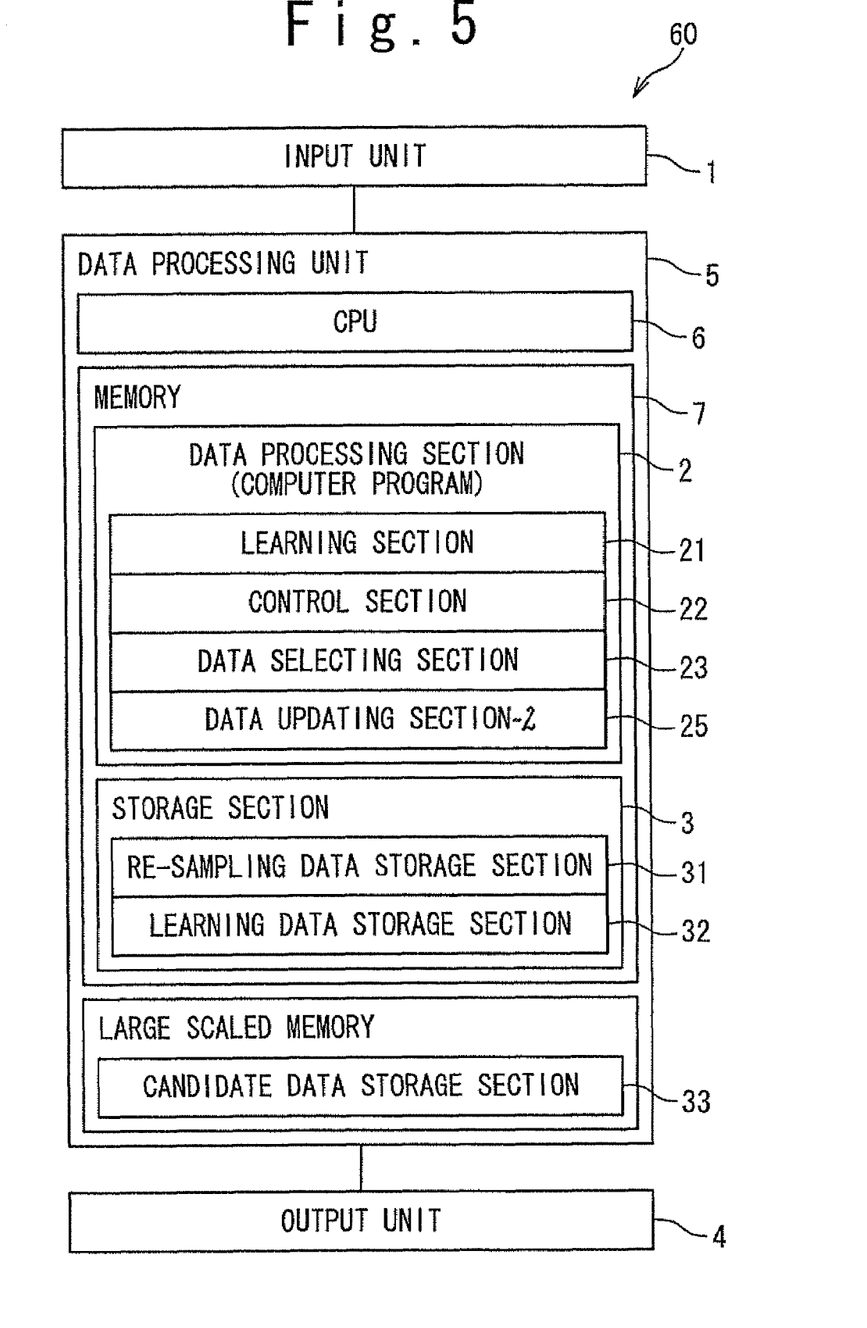
FIG. 5 is a block diagram showing the configuration of a knowledge discovery system as the learning system according to the second embodiment of the present invention.

In the learning system according to the second embodiment of the present invention, the description of components and operations that are the same as in the learning system (active learning system 50) according to the first embodiment of the present invention are omitted. FIG. 5 is a block diagram showing the structure of knowledge discovery system 60 as the learning system according to the second embodiment of the present invention. The data processing section 2 of the knowledge discovery system 60 is composed of the data updating section-2 25 in place of the data updating section-1 24 of the data processing section 2 of the active learning system 50.

Figure 6:
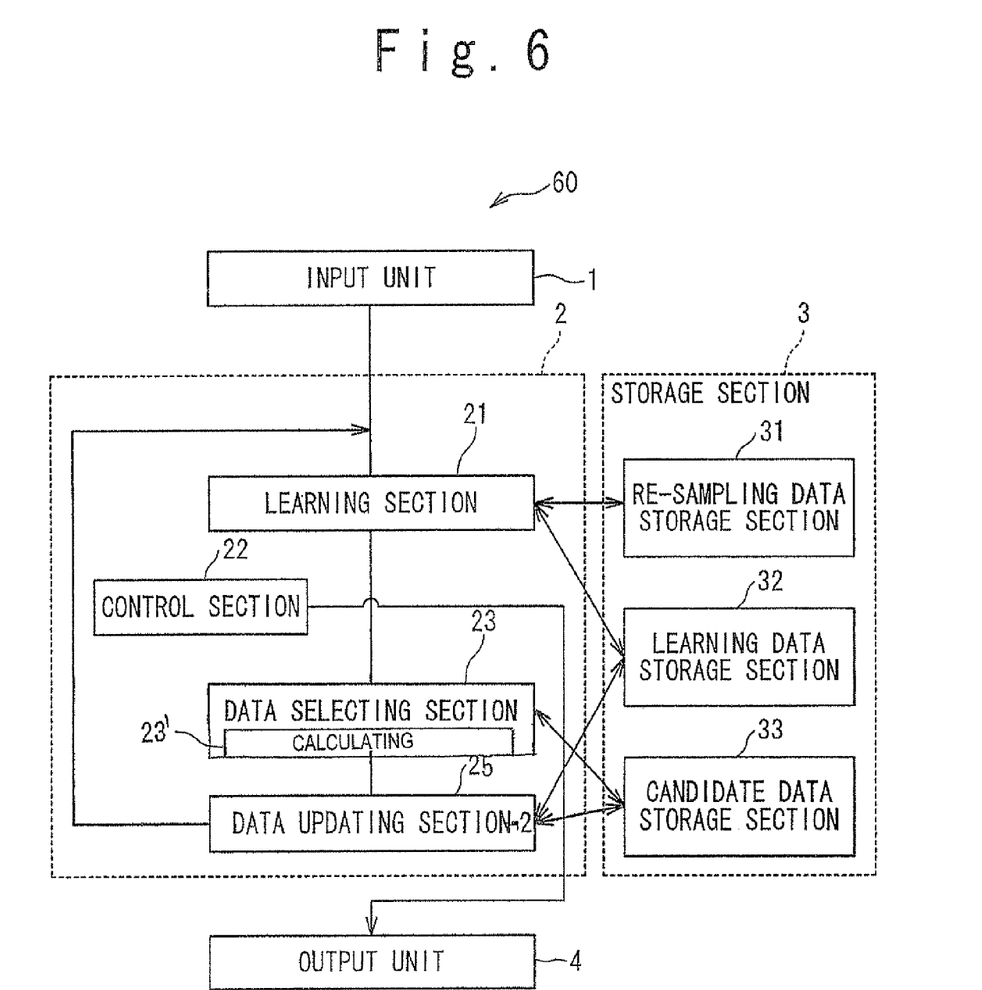
FIG. 6 is a diagram showing the function logic of FIG. 5.

FIG. 6 is a diagram showing the function logic of FIG. 5. A plurality of the candidate data are stored in the candidate data storage section 33. In case of the knowledge discovery system 60, each of the plurality of candidate data is a data to which the label (class or function value) is set.

The data updating section-2 25 of the data processing section 2 carries out a data updating process. In case of the knowledge discovery system 60, in the data updating process, the data updating section-2 25 outputs the desired candidate data selected by the data selecting section 23 to the learning section 21 as the learning data and deletes the desired candidate data stored in the candidate data storage section 33.

Figure 7:
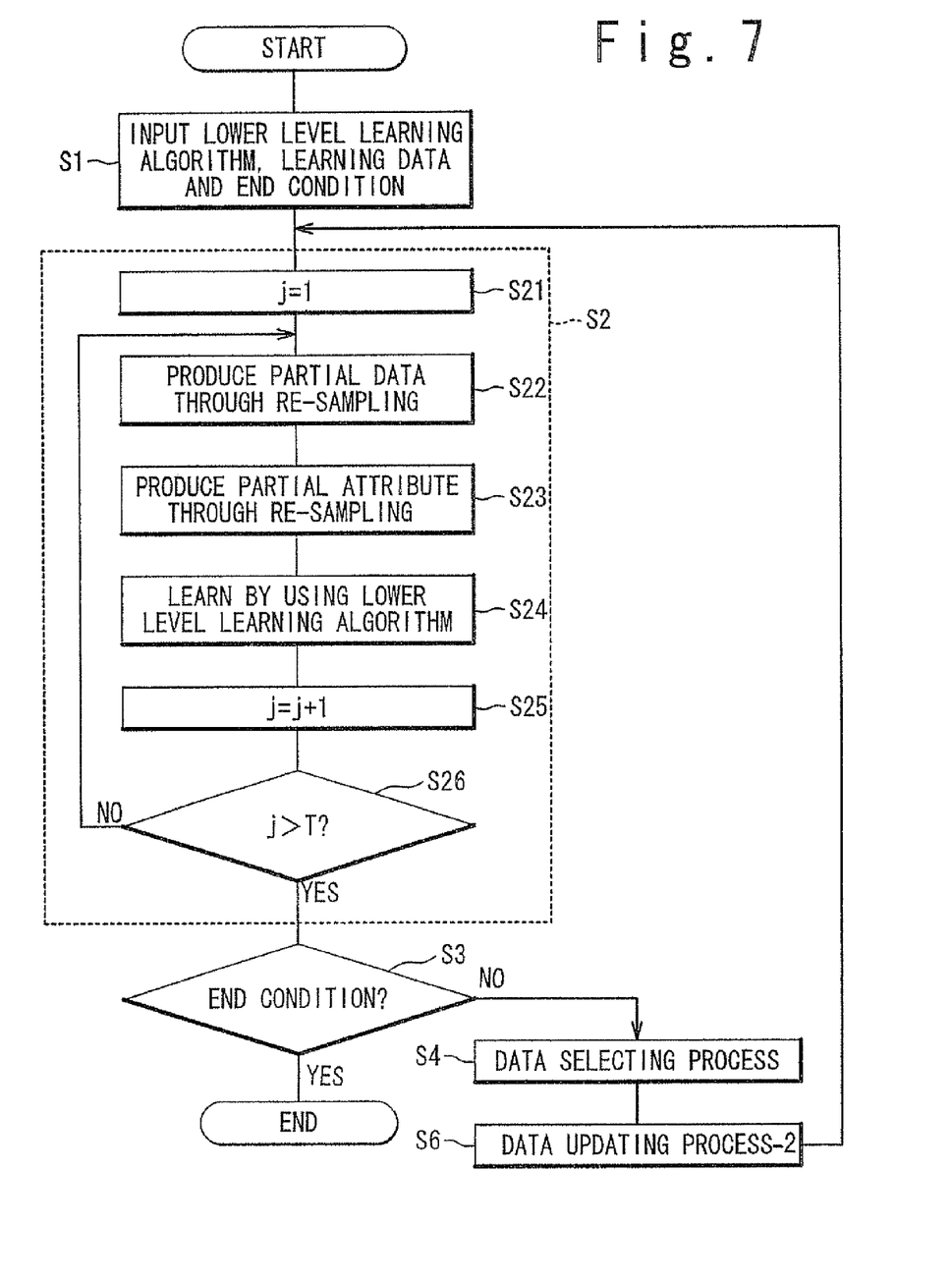
FIG. 7 is a flow chart showing an operation of the knowledge discovery system as the learning system according to the second embodiment of the present invention.

Next, a case in which the ensemble learning is carried out as the operation of the knowledge discovery system 60 of the present invention will be described in detail. FIG. 7 is a flow chart showing the operation of the knowledge discovery system 60 of the present invention.

The data processing section 2 carries out the steps S1 to S4 in the same manner as the active learning system 50 of the first embodiment. Next, the data updating section-2 25 of the data processing section 2 carries out the data updating process-2 (Step S6).

In the data updating process-2 (step S6), the data updating section-2 25 outputs the desired candidate data selected by the data selecting section 23 to the learning section 21 as the learning data, and deletes the desired candidate data stored in the candidate data storage section 33. Then, the learning section 21 carries out a learning process (step S2).

The case in which the ensemble learning is carried out as the operation of the knowledge discovery system 60 of the present invention is described. However, when the ensemble learning is not carried out, as with the case of the active learning system 50, the above-mentioned steps S21 to S23, S25, and S26 are unnecessary. Because the number of the hypotheses generated by the learning section 21 at step S2 is one when ensemble learning is not performed, the data selecting section 23 does not have to carry out an average with the weighting to the hypotheses generated by the learning section 21 in the score calculating process of the data selecting process (step S4).

Next, the effect of the knowledge discovery system 60 of the present invention will be described. The effect of the knowledge discovery system 60 of the present invention is almost the same as that of the active learning system 50.

According to the knowledge discovery system 60 of the present invention, a desired result can be predicted when discovering knowledge. For example, a re-learning (knowledge discovery) can be carried out efficiently when the plurality of candidate data are the unbalanced data or the data of different values.

In the knowledge discovery system 60 of the present invention, when the plurality of candidate data are the unbalanced data, the score is calculated for each of the plurality of candidate data by using the hypotheses, and the desired candidate data are selected from among the plurality of candidate data based on the calculated scores. Therefore, the candidate data of a smaller data quantity can be selected and various types of candidate data which belong to the label (class or function value) of the learning data can be acquired. Therefore, a better hypothesis can be generated, and a desired result can be predicted.

In the knowledge discovery system 60 of the present invention, when the plurality of candidate data are the data of different values, the score is calculated for each of the plurality of candidate data using the hypotheses, and the desired candidate data can be selected from among the plurality of candidate data based on the calculated scores. Therefore, the candidate data of a high value can be selected and the various types of candidate data which belong to the label (class or function value) of the learning data can be acquired. Therefore, a better hypothesis can be generated, and a desired result can be predicted.

In the knowledge discovery system 60 of the present invention, when the desired candidate data is selected from among the plurality of candidate data, it does not always select the candidate data with the largest amount of data or most data quantity. In the knowledge discovery system 60 of the present invention, as the technique to select the desired candidate data containing the unbalanced data or the data of different values, the selection function (e.g. exponential function) is used. Therefore, the data is uniformly selected from the data space and can prevent instability of a solution. Conventionally, when the number of the learning data is small, so that only the candidate data with maximum scores are selected, negative examples are partially lacking in the determination tree and a correct hypothesis cannot be generated. In this way, it is desirable to use the selection function to select the desired candidate data containing the unbalanced data or the data of different values from among the plurality of candidate data.

According to the knowledge discovery system 60 of the present invention, the prediction precision is stable when predicting a desired result of the discovering knowledge. In the knowledge discovery system 60 of the present invention, because the criterion to select the desired candidate data is not previously determined (the criterion is not always to select the candidate data with the most data), the selected candidate data (desired candidate data) are never biased. In other words, when the learning progresses in some degree, so that the scores to the candidate data become similar, there is a possibility that only the data of a partial tree of the determination tree are selected if the predetermined scores are selected. However, in the knowledge discovery system 60 of the present invention, because the candidate data are selected stochastically, the candidate data are dispersed appropriately and the selection data (the selected candidate data) are never biased. The candidate data are uniformly selected from the data space and can prevent the instability of a solution. Therefore, the hypothesis reflecting all of the candidate data can be generated and the prediction precision is stable.

According to the knowledge discovery system 60 of the present invention, the prediction precision is improved when predicting a desired result when the attributes are selected in the ensemble learning of discovering knowledge.

In the knowledge discovery system 60 of the present invention, the attributes of the learning data are re-sampled in addition to the re-sampling of the learning data. Therefore, unnecessary attributes can be excluded. Thus, even if some optimal selection probabilities dependent on the number of unnecessary attributes and the data are present, the prediction precision is improved. Also, the number of the attributes becomes small so that the calculation efficiency is improved. Therefore, the prediction precision is improved. If the re-sampling is carried out a number of times corresponding to the original number of the attributes, about 60 percent of the attributes are selected on average. However, it is possible to disperse the range of the candidate data more widely than a case in which 50 percent of attributes are randomly selected in the above-mentioned conventional technique.

In this way, in the knowledge discovery system 60 of the present invention, when the learning data is learned based on the partial attribute after the partial data and the unnecessary attributes are excluded and the plurality of hypotheses are generated, the desired result can be more quickly predicted than when using the conventional technique, and the prediction precision is improved.

In the knowledge discovery system 60 of the present invention, when a determination tree or a regression tree is used for the lower level learning algorithm with the unbalanced data or the data of different values, a rate of the positive examples in the leaf or a value calculated from it is used in the calculation of the score, such that the unbalanced data or the data of different values are contained in the desired candidate data, as shown in the equations (2) and (3). Therefore, according to the knowledge discovery system 60 of the present invention, it is possible to generate the better hypotheses or predict a desired result, using the unbalanced data and the data of the different values.

Next, the operation of the knowledge discovery system 60 of the present invention will be described using a specific example. A system is described in which an active compound is searched from the candidate data storage section 33 in a new medicine production screening as the knowledge discovery system 60 of the present invention. In this case, the active compound is equivalent to a positive example with the high value in the smaller number of candidate data and inactive compound is equivalent to a negative example with the low value in the larger number of candidate data. Also, it is assumed that the lower level learning algorithm is the algorithm to learn a determination tree and bagging is carried out as the ensemble learning.

The learning section 21 receives (1) the learning data in which existence or non-existence of activity is indicated, (2)

the algorithm (lower level learning algorithm) learning a determination tree, and (3) the end condition at the step S1. The learning section 21 controls the lower level learning algorithm of the determination tree to learn the current learning data, i.e., the plurality of partial samples formed from the learning data through the sampling in the learning process (step S2), and a plurality of determination trees are obtained.

Next, the control unit 22 determines whether the end condition is met, and outputs the plurality of determination trees to the output unit 4 if the end condition is met, and then ends the control. If the end condition is not met, the data selecting section 23 calculates each positive example score of the plurality of determination trees to the plurality of candidate data stored in the candidate data storage section 33 in the data selecting process (step S4) by using the above-mentioned technique and then calculates an average of the calculated scores. Thus, the desired candidate data is determined based on the selection function which is predetermined based on the calculated scores of the plurality of candidate data.

Unlike the active learning system 50, in the second embodiment, the labels of the plurality of candidate data are already known. Therefore, the label of the desired candidate data is already known. The data updating section-2 25 deletes the selection data from the candidate data storage section 33 by selecting the selection data (the desired candidate data) with the label as the learning data in the data updating process-2 (step S6). The learning section 21 continues a knowledge discovery based on the learning data (the desired candidate data).

For example, the learning system of the present invention can be applied to bio-informatics to search the active compound in new medicine production screening. Especially, it is possible to apply the learning system of the present invention to applications such as data mining in which desired candidate data is selected from the plurality of candidate data containing the above-mentioned unbalanced data and the data of different values.

What is claimed is:

1. A learning system comprising:
   an input section which obtains learning data to which labels are set and an end condition;
   a learning section which learns said learning data through an ensemble learning by using a learning algorithm to generate hypotheses;
   a storage section in which a plurality of candidate data having no label are stored;
   a calculating section which carries out an averaging with weights to said plurality of hypotheses, refers to said storage section and calculates a score for each of said plurality of candidate data by using said hypotheses;
   a selecting section which selects desired candidate data from among said plurality of candidate data based on the calculated scores, said selecting section having a previously set stochastic selection function;
   a data updating section which sets a label determined by a user to said desired candidate data and adds said desired candidate data to said learning data and outputs to said learning section;
   an output unit; and
   a control unit which outputs said hypotheses generated by said learning section to said output unit when said end condition is met,
   wherein said learning section re-samples said learning data to generate partial data by said ensemble learning, and re-samples an attribute of said learning data to generate a partial attribute, and learns said learning data based on said partial data and said partial attribute, wherein said calculated scare has a numeric value of a likelihood of a positive example of each candidate data.

2. The learning system according to claim 1, wherein said selection function is a function which decreases exponentially.

3. A learning method of learning data with a label set, comprising:
   (a) inputting, on an input unit, said learning data and an end condition;
   (b) generating hypotheses through learning of said learning data through an ensemble learning by using a learning algorithm, wherein a plurality of candidate data with no label are stored in a storage section;
   (c) calculating a score for each of said plurality of candidate data by using said hypotheses by referring to said storage section;
   (d) selecting, on a data processing unit, using a previously set stochastic selection function, a desired candidate data from among said plurality of candidate data based on the calculated scores;
   (e) setting a label determined by the user to said desired candidate data selected by the user;
   (f) carrying out said (b) step by adding said desired candidate data to said learning data;
   (g) carrying out said (c) step, said (d) step, said (e) step and said (f) step when said end condition is not met; and
   (h) outputting, on an output unit having at least one of a display unit and a printer, said hypotheses generated in said (f) step to an output unit when said end condition is met,
   wherein said (b) step comprises:
   re-sampling said learning data to generate partial data by said ensemble learning;
   re-sampling an attribute of said learning data to generate a partial attribute; and
   learning, on the data processing unit, said learning data based on said partial data and said partial attribute; wherein the input unit and the output unit are connected with the data processing unit, wherein said calculated score has a numeric value of a likelihood of a positive example of each candidate data.

4. The learning method according to claim 3, wherein said selection function is a function which decreases exponentially.

5. A computer-readable medium having computer readable program for operating on a computer for realizing a learning method of a learning data with a label set, said program comprising instructions that cause the computer to perform the steps of:
   (a) inputting, on an input unit, said learning data and an end condition;
   (b) generating hypotheses through learning of said learning data through an ensemble learning by using a learning algorithm, wherein a plurality of candidate data with no label are stored in a storage section;
   (c) calculating a score for each of said plurality of candidate data by using said hypotheses by referring to said storage section;
   (d) selecting, on a data processing unit, using a previously set stochastic selection function, a desired candidate data from among said plurality of candidate data based on the calculated scores;
   (e) setting a label determined by the user to said desired candidate data selected by the user;
   (f) carrying out said (b) step by adding said desired candidate data to said learning data;

(g) carrying out said (c) step, said (d) step, said (e) step and said (f) step when said end condition is not met; and (h) outputting, on an output unit having at least one of a display unit and a printer, said hypotheses generated in said (f) step to an output unit when said end condition is met, wherein said (b) step comprises:

re-sampling said learning data to generate partial data by said ensemble learning;

re-sampling an attribute of said learning data to generate a partial attribute; and learning, on the data processing unit, said learning data based on said partial data and said partial attribute, and wherein the input unit and the output unit are connected with the data processing unit, wherein said calculated score has a numeric value of a likelihood of a positive example of each candidate data.

* * * * *